March 25, 1924.

T. BRIDGWOOD

FASTENING DEVICE

Filed July 24, 1922

Inventor.
Thomas Bridgwood
by Herbert W. Jenner,
Attorney.

Patented Mar. 25, 1924.

1,488,031

UNITED STATES PATENT OFFICE.

THOMAS BRIDGWOOD, OF STOKE-ON-TRENT, ENGLAND.

FASTENING DEVICE.

Application filed July 24, 1922. Serial No. 577,166.

*To all whom it may concern:*

Be it known that I, THOMAS BRIDGWOOD, subject of the King of Great Britain and Ireland, and resident of 35 Chetwynd Street, Smallthorne, Stoke-on-Trent, in the county of Stafford, England, motor mechanic, have invented certain new and useful Improvements in Fastening Devices (for which I have filed application in Great Britain by application for Patent No. 178,654, dated the 25th day of February, 1921), of which the following is a specification.

My invention relates to a new or improved means of attaching and detaching the wheels of motor vehicles applicable also for connecting pulleys and the like to shafting, the object being to provide rapid detachability and assembling together with absolute security.

Figure 1:
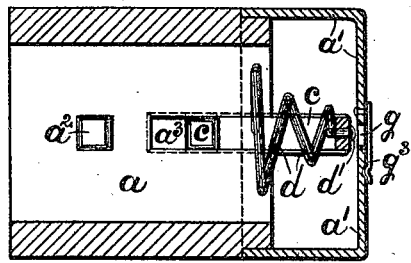
Fig. 1 is a sectional elevation illustrating the boss of a motor wheel with dogs for locking it in position in the manner to be herein described.
Figure 5:
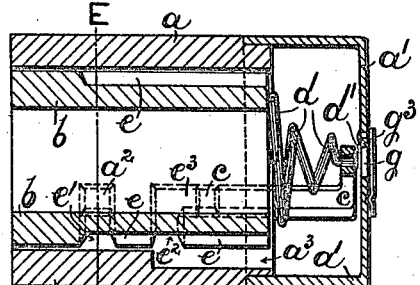
Figs. 4 and 5 are similar views to Fig. 3 but with the locking dogs in different positions which will be herein referred to, Fig. 6 is an end view as seen from the left side of Fig. 1.
Figure 2:
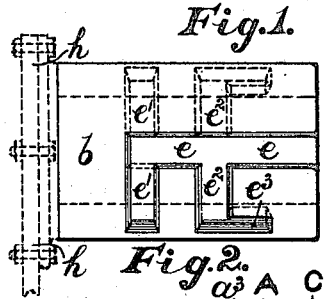
Fig. 2 is an elevation of a driving sleeve or shaft to accommodate the boss of the wheel shown at Fig. 1.
Figure 6:
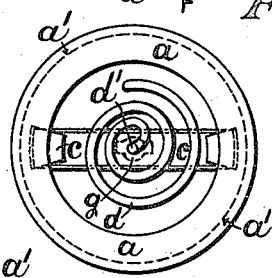
Figure 7:
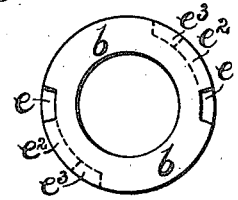
Fig. 7 is an end view of the driving sleeve shown at Fig. 2.

$a$ is the boss of a motor wheel, $a^1$ a dust cover on the outside thereof, whilst $b$ (shown detached in full lines at Fig. 2) is the driving sleeve. The boss of the wheel $a$ (Fig. 1) carrying the locking dogs (which will be referred to later), is constructed to slide in position on the driving sleeve $b$ and by a part rotation of the motor wheel the dogs are caused to engage the driving sleeve by which means the wheel is firmly secured thereto in a very expeditious manner.

The interior of the boss $a$ of the motor wheel (Fig. 1) is provided with two fixed projections or dogs $a^2$ and longitudinal grooves $a^3$ in which slides a spring-controlled key or dog $c$. The spiral spring $d$ is connected at its outer end $d^1$ to the dog $c$, the coil of the spring being increased at its inner end to take against the outer end of the driving sleeve $b$. The slidable key or dog $c$ referred to is of U formation with the outer ends of the U turned inwards as shown in sectional elevation at Fig. 4 but if desired the portion of the dog where the spiral spring is connected may be of annular formation instead of a narrow width as shown on the drawings. The spiral spring $d$ is employed to exert a constant outward pressure to the key or dog $c$.

The driving sleeve $b$ has a similar number of key-ways or grooves $e$ formed longitudinally and diametrically opposite each other and at their inner ends the grooves $e$ are continued a short distance transversely at $e^1$ and another set of grooves $e^2$ are formed a suitable distance from the first set to run parallel to them and then are formed a further short distance at $e^3$ at an angle of ninety degrees.

To assemble the parts, the driving sleeve $b$ is first mounted securely on the axle of the vehicle over the bearings in the usual way and is the non-detachable part when the wheel is changed.

Figure 3:
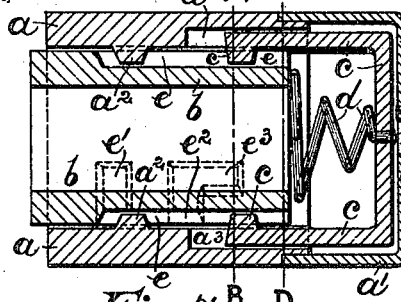
Fig. 3 is a sectional elevation showing the boss of the wheel and the driving sleeve together but in their unlocked position.
Figure 8:
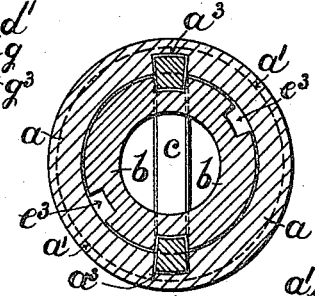
Fig. 8 is a cross section through A—B of Fig. 3.
Figure 4:
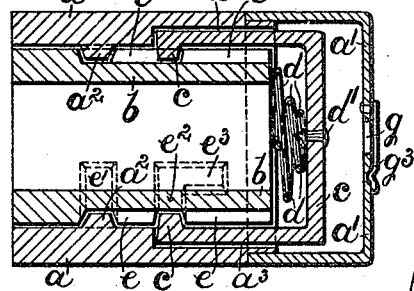
Figure 9:
Fig. 9 is a similar section through C—D of Fig. 3.
Figure 10:
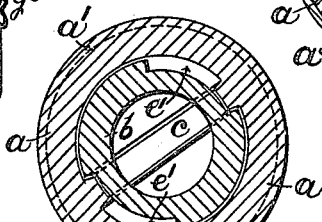
Fig. 10 is a cross section through E—F of Fig. 5, Fig. 11 are front and side elevations respectively of a key for sliding the spring-controlled dog in a manner to be herein described.
Figure 11:
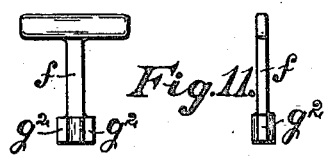

The fixed dogs $a^2$ arranged in the wheel boss $a$ are then placed in the longitudinal grooves $e$ formed on the driving sleeve $b$, the wheel is then slid inwards until the fixed dogs $a^2$ of the boss $a$ thereof reach the end of the grooves $e$ (as shown at Fig. 4). Fig. 3 is illustrated to clearly show the fixed dogs $a^2$ in the longitudinal groove $e$ and just prior to the wheel boss $a$ being pushed the full length of the longitudinal grooves $e$. When the said fixed dogs $a^2$ are opposite the transverse grooves $e^1$ (Fig. 4) a key $f$ (Fig. 11) is inserted in the key-hole $g$ in the dust cover $a^1$ of the wheel boss $a$, the key $f$ being forced inwards compressing the spring $d$ until the ends of the slidable dog $c$ are opposite the transverse grooves $e^2$ (as shown at Fig. 4) when the wheel can be rotated a short distance out of relation with, or independently of, the driving sleeve $b$, the pressure on the key being then released allows the dog $c$ to move forward along the short longitudinal groove $e^3$ the stored up energy in the spring $d$ causing this action. The fixed dogs $a^2$ on the wheel boss $a$ then securely engage at the end of the short transverse grooves $e^1$ and thereby prevent any lateral movement of the wheel. By these means the wheel is locked firmly in position on the driving sleeve $b$.

To detach the wheel from the driving sleeve $b$, the key $f$ is pushed through the key-hole $g$ again which compresses the spring $d$, and when the ends of the dog $c$ reach the inner ends of the short transverse grooves $e^2$ the wheel is rotated a short distance, the ends of the dog $c$ then passing through the transverse grooves $e^2$ and into the longitudinal slots $e$ when the wheel can be slid outwardly away from the driving sleeve $b$.

The insertion of the key $f$ through the slot $g$ presses the dog $c$ forward and by a slight rotation of the key $f$ in the keyhole $g$, to allow the projections $g^2$ to take transversely of the key-hole $g$, the dog $c$ can be retained in position whilst the wheel is rotated.

A hinged or other suitable cover $g^3$ may be employed over the key-hole $g$ to exclude dust.

In order to support a spare wheel constructed in accordance with this invention I employ a suitable bracket $h$ (shown dotted at Fig. 2) secured to a convenient part of the vehicle and having fixed thereto a sleeve similar to the driving sleeve $b$ hereinbefore referred to, the wheel being slid thereon and locked thereto in precisely the same manner as placing the wheel on the driving sleeve $b$ of the vehicle.

What I claim is:

1. In a fastening device, a revoluble driving sleeve having two main longitudinal grooves in its outer side, said grooves each having two transverse grooves on one side, and one of each of the transverse grooves having an auxiliary longitudinal groove at its end arranged to one side of the main groove to which it pertains, a hub or boss slidable and revoluble on the said sleeve and provided with two dogs which are slidable in the said longitudinal main grooves and two of the transverse grooves, said hub or boss having also longitudinal grooves which register with the said longitudinal main grooves, a U-shaped key slidable in the longitudinal grooves of the said hub or boss and having projections at its end portions for engaging with the said main longitudinal grooves and in the other two transverse grooves and in the said auxiliary longitudinal grooves, and a spring which moves the hub or boss longitudinally away from the said sleeve and holds the projections of the key in engagement with the said auxiliary longitudinal grooves.

2. A fastening device as set forth in claim 1, the said spring being of helical form and interposed between the middle part of the said U-shaped key and the outer end of the said sleeve.

3. In combination with a fastening device as set forth in claim 1, a cap secured to the said hub or boss and inclosing the said U-shaped key, said cap being provided with a hole at its end, and a wrench insertable through the said hole in the cap and affording a means for compressing the said spring and for moving the said dogs and projections circumferentially into and out of engagement with the said transverse grooves.

In testimony whereof I have hereunto set my hand in the presence of two witnesses.

THOMAS BRIDGWOOD.

Witnesses:
J. BENTON,
J. H. COPESTATER.